Oct. 24, 1944.　　　J. A. CALDWELL　　　2,361,174
MEASURING INSTRUMENT
Original Filed Dec. 15, 1938　　3 Sheets-Sheet 1

INVENTOR
JOHN A. CALDWELL
BY George M. Ullenchamp
ATTORNEY

Oct. 24, 1944.  J. A. CALDWELL  2,361,174
MEASURING INSTRUMENT
Original Filed Dec. 15, 1938  3 Sheets-Sheet 2
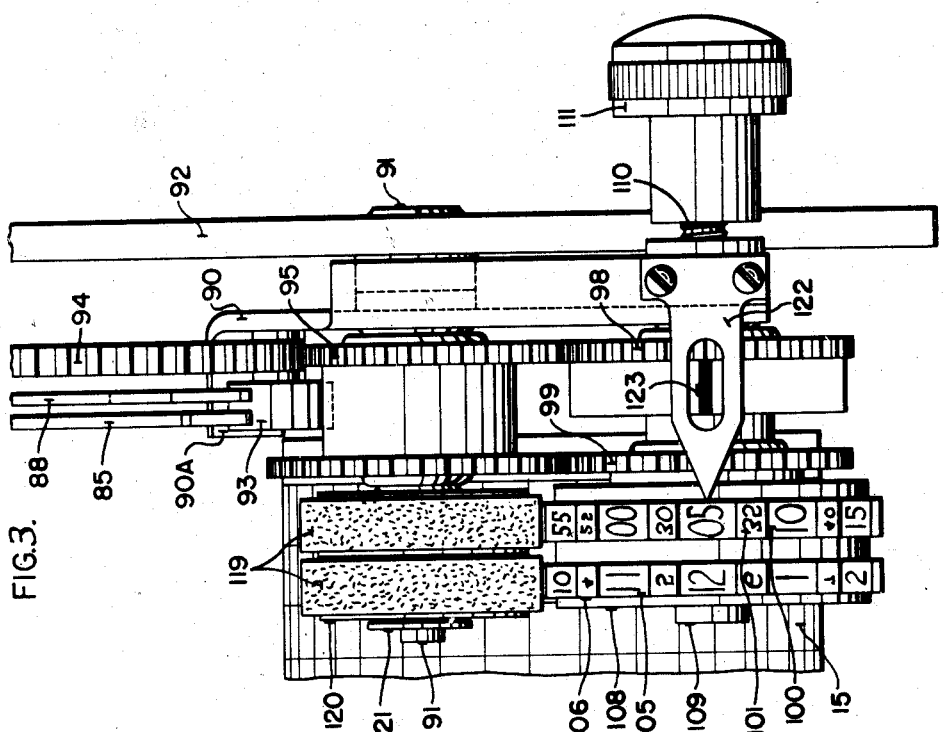
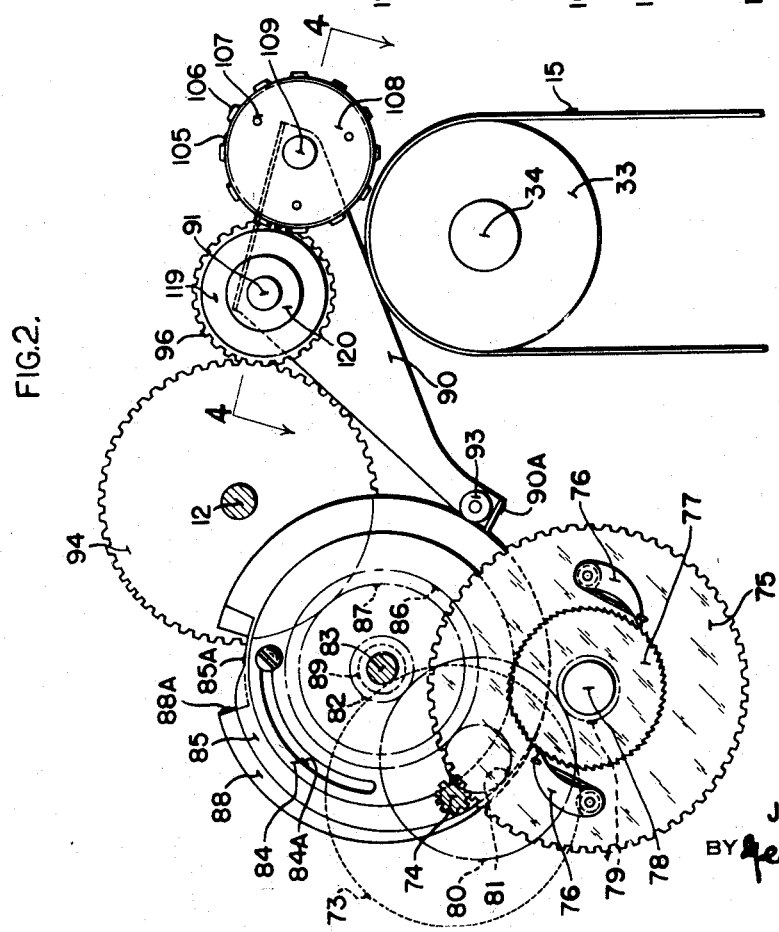
INVENTOR
JOHN A. CALDWELL
BY George M. Munchauf
ATTORNEY Oct. 24, 1944.  J. A. CALDWELL  2,361,174
MEASURING INSTRUMENT
Original Filed Dec. 15, 1938  3 Sheets-Sheet 3

INVENTOR
JOHN A. CALDWELL
BY George W. Muschamp
ATTORNEY

Patented Oct. 24, 1944

2,361,174

UNITED STATES PATENT OFFICE 2,361,174

MEASURING INSTRUMENT

John A. Caldwell, Philadelphia, Pa., assignor to The Brown Instrument Company, Philadelphia, Pa., a corporation of Pennsylvania Original application December 15, 1938, Serial No. 245,928. Divided and this application September 21, 1939, Serial No. 295,846

6 Claims. (Cl. 234—56)

The present invention is a division of my copending application Serial Number 245,928, filed December 15, 1938, now Patent No. 2,275,246 issued March 3, 1942, and relates to high speed measuring and recording apparatus in which it is desirable to obtain an accurate record of the value of the condition being measured and to obtain a knowledge of the time that the record was made.

In instruments of this type as the record is being made, if the value of the condition remains approximately constant, the chart upon which the record is recorded may be driven at a fairly low speed and the record will still be entirely legible. Upon the occurrence of sudden and large changes in the value of the condition, however, it is desirable to have a detailed knowledge of the changes and in order to obtain them the chart must be driven at a much higher rate of speed. Inasmuch as these changes may occur at any time it is desirable if not necessary that the change in chart speed be responsive to the alteration of the condition a predetermined amount from normal.

In the ordinary type of chart used on recording instruments the chart is provided with vertical lines to indicate the value of the condition and horizontal lines to indicate the time at which the record was made. If, however, the chart is driven at different speeds at irregular intervals the normal time lines become useless and some auxiliary means is necessary in order to indicate time on the chart.

It is an object of the invention to provide a means to mark the time of day on the chart at periodic intervals so that regardless of the speed of the chart the correct time of the record will always be indicated thereon.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

In the drawings:

Fig. 2 is a side view of the time printing device and its drive means;

Fig. 3 is a plan view of the printing mechanism on a larger scale;

Figure 1:
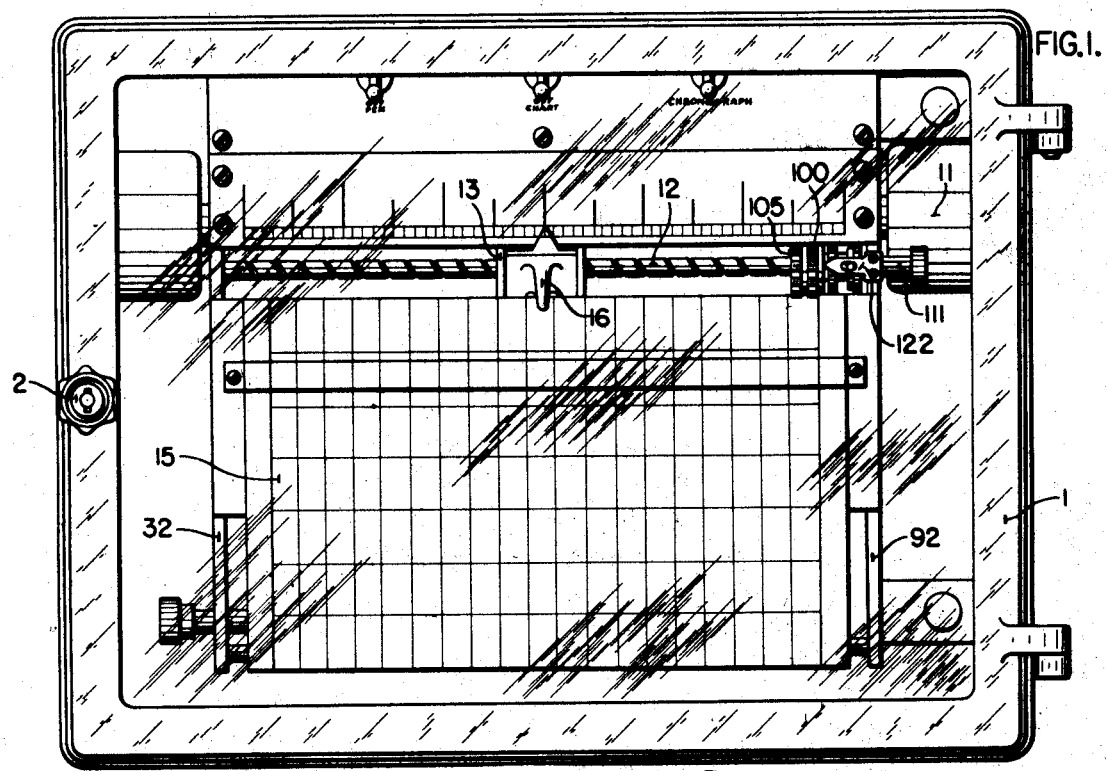
Fig. 1 is a front view of an instrument embodying my invention.

There is illustrated in Fig. 1, one form which an instrument of the present invention may take. The instrument is provided with some suitable casing that has a door 1 hinged at one side to the casing and provided at its other side with a combined knob and lock 2 by which the door may be opened to provide access to the mechanism in the casing. A glass window is in the door through which may be seen various of the essential parts of the mechanism which will be described in detail later.

The instrument is provided with a high speed measuring system of any desired type, and may well take the form of that shown in the application of Thomas R. Harrison, Serial Number 145,637, filed on May 29, 1937, now Patent 2,245,034 issued June 10, 1941. Such a system is used to measure, for example, the temperature of a hot body such as a billet as it is being moved from a heating furnace to the rolls of a rolling mill or as it passes between the rolls. The instrument is so constructed that normally a pen 16 forming part thereof is positioned at the low or left side of the chart 15. When the temperature of a billet is being measured, however, the helically threaded shaft 12 is rotated an amount proportional to the value of the billet temperature to move a pen carriage 13 carrying the pen 16 to the right to a position corresponding to the value of that temperature. As the pen carriage 13 moves to the right it actuates a mechanism to speed up the chart 15 upon which the record of the temperature is being made.

By the use of a chart driving mechanism that has two speeds the chart is driven at the high speed only as long as the emergency exists, or as long as the billet is passing the measuring element. At all other times the chart is driven at a slow or normal speed. This prevents unnecessary waste of the chart inasmuch as it is not run at a high speed any longer than necessary. In the ordinary instrument in which the chart is provided with horizontal time lines such an arrangement would render them useless because of the irregular changes of chart speed. In order to overcome this necessary disadvantage I provide as my invention a device to mark on the chart the time of day at periodic intervals, so that the time any part of the record was made may be easily ascertained. When the multi-speed chart drive and time printing mechanism are used together on the same instrument a high speed legible and easily interpreted record line is produced. The normal horizontal lines may, if desired, be retained on the chart to be used for convenience in interpolating the time of the readings between the periodically printed time marks. It is preferable that the high speed drive have some definite relation to the low speed drive, such as a speed in inches per hour at low speed and the same number of inches per minute at high speed.

There is shown in Figs. 2 to 5 one form of time printing mechanism that may be used, and the drive means therefor. Referring first to Fig. 2 there is shown in dotted outline a synchronous motor 73 that has on its drive shaft a pinion 74 which, through gearing now to be described, drives the printing mechanism. The pinion 74 meshes with and drives a gear 75 which carries a pair of pawls 76 that are spring pressed into engagement with a ratchet 77 which is fast on shaft 78. The gear 75 is loosely journaled on the shaft 78, the arrangement being that the shaft 78 may be rotated if desired by some manual means, such as a knob in the end of the shaft, faster than it is normally driven by motor 73.

Fastened to the shaft 78 is a pinion 79 that meshes with and drives a gear 80 and pinion 81. The gear 80 drives a pinion 82, attached to one end of a shaft 83, to the other end of which is fastened a disc 84 having a slot 84A in it. Rotatable on the shaft 83 is a cam 85 that is adjustably secured to the disc 84 by means of a screw extending through the slot 84A and into the cam. The arrangement is such that the cam 85 is driven at a fairly high speed from the gear 75. The pinion 81, driven with gear 80, meshes with and drives a gear 86, that along with a gear 87 and a cam 88, is attached to a sleeve 89 which rotates on the shaft 83. In this manner, the cams 85 and 88 are mounted side by side and rotated at different speeds, the cam 85 rotating faster than the cam 88.

A supporting plate 90 for the printing mechanism per se is pivoted at 91 to the right hand side plate 92 of the instrument. The lower edge of plate 90 is bent as shown at 90A and is also provided with a roller 93. The plate 90 is biased by gravity and a spring 91A to hold the edge 90A close to and roller 93 in engagement with the cams 85 and 88 so that as the cut-out portions 85A and 88A of the cams 85 and 88, respectively, move under the edge and roller the plate 90 will be permitted to move clockwise to bring the time printing characters into engagement with chart 15. The roller 93 normally bears against the cams 85 and 88 so that the frictional drag on the cams will be small, but just prior to the time that printing is to occur the roller 93 passes out of engagement with the cams and the edge 90A comes into engagement therewith. The purpose of this is to give a sharp, quick action to the plate 90 that cannot be obtained when the roller 93 moves off the edge of the cam. The cams 85 and 88 are so adjusted relative to each other that periodically, say every five minutes, the leading edges of their cut-out portions will simultaneously move in a clockwise direction past edge 90A so that a printing operation may take place. Almost immediately thereafter the cam 85 rotating at high speed, engages roller 93 to move the plate 90 counter-clockwise to lift the print wheels out of engagement with the chart 15. During this initial rotation of the cam 85 after a printing operation has taken place the roller 93 and edge 90A will be moved by that cam to the positon shown in Figure 2. Also during this rotation of cam 85 the cam 88 will have rotated sufficiently so that the following edge of cut-out portion 88A will be beyond the edge 90A to hold plate 90 in its Figure 2 position until another printing operation is to take place. The cam 85 is rotating rapidly enough so that it will lift the printing character out of engagement with the chart before the chart, if moving at a high speed, can blur the printing.

Figure 4:
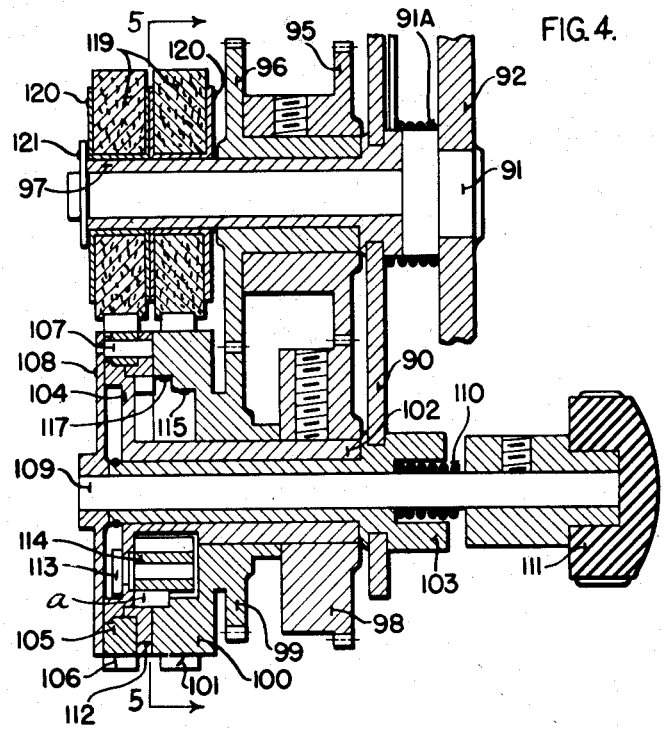
Fig. 4 is a section view taken on line 4—4 of Fig. 2.
Figure 5:
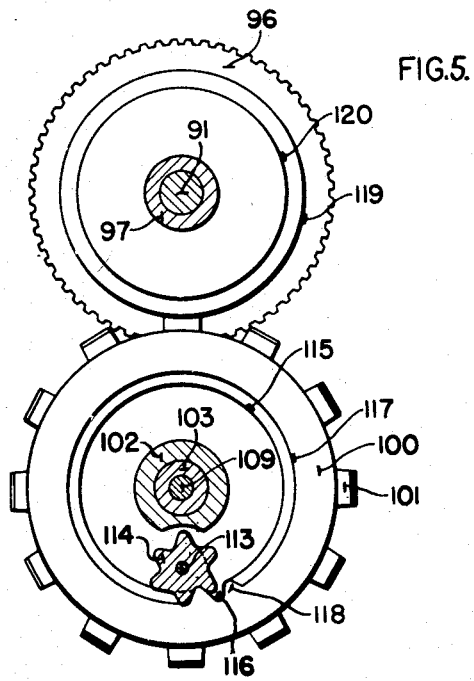
Fig. 5 is a section view taken on line 5—5 of Fig. 4.

The gear 87 meshes with a gear 94, rotatable around the threaded shaft 12, which gear drives the printing mechanism that is more clearly shown in Figs. 3 to 5. Meshing with and rotated at a constant speed by gear 94 is a gear 95 that is attached to a gear 96, both of the latter being rotatable around a sleeve 97 on pivot pin 91. It is noted that plate 90 is attached to the sleeve 97 so that the sleeve 97 and plate 90 oscillate together around pin 91 to perform the printing operation. The gears 95 and 96 are of slightly different diameters and they drive gears 98 and 99, respectively, at such relative speeds that the gear 99 rotates one and one-twelfth times for each rotation of the gear 98. The gear 99 is shown as being integrally formed with a minute print wheel 100 that has twelve printing characters 101 formed on its surface. The speed of rotation of the print wheel is such that it is driven from motor 73 through the above described gear train at a rate of one and one-twelfth revolutions each five minutes. In this manner a different printing character is brought into printing position every five minutes.

The gear 99 rotates on a sleeve 102 that is attached to and rotated by the gear 98, and the sleeve revolves around a tubular journal 103 which is rigidly attached to plate 90. Rotatably supported by a web or disc 104 formed on the end of sleeve 102 and extending radially therefrom is an hour print wheel 105 that is provided on its periphery with printing characters 106. This print wheel 105 is formed as an annular member and is provided with a series of openings in it through which extend pins 107 that are attached to a disc 108 mounted on shaft 109. The shaft extends through the hollow journal 103 and is biased toward the right to maintain pins 107 in the print wheel 105 by means of a spring 110 bearing at one end against journal 103 and at its other end against a knob 111 on the shaft. The pins 107 also extend into openings in an annular internal gear 112 that is mounted on the web or disc 104 beside the print wheel 105. The gear 99 drives the hour print wheel 105 at the speed of one revolution every five minutes so that every five minutes the same character 106 is in printing position.

From the above it will be seen that the same printing character on the hour wheel will continuously return to printing position while a new character on the minute wheel will be placed in printing position at the end of each interval of five minutes. Means are provided to advance the hour wheel one-twelfth of a revolution relative to the minute wheel at the end of every twelve printing oprations, or at the end of each hour. This is accomplished in the following manner.

The disc 104 is provided with a small stud shaft 113 extending therefrom, upon which is journaled a small pinion 114 having six teeth every other one of which is shorter than those adjacent it as shown at $a$ in Fig. 4. The interior of print wheel 100 is formed in cross-section with a step 115 in which is formed one depressed gear tooth 116 and with a step 117 in which are formed two raised gear teeth 118, the depression 116 being located in between the teeth 118. Normally two long teeth of the pinion 114 are resting on the step 115 while the intermediate short tooth is extending downwardly toward the step 117. In this manner the pinion 114 is normally locked against rotation and since its teeth are at all times in mesh with those of internal gear 112, that gear and the hour print wheel attached thereto by pins 107 are prevented from rotating with respect to their driving shaft, sleeve 102.

During the operation of the device between the times the hour wheel is to be stepped forward relative to the minute wheel, the long teeth of the pinion 114 rest on step 115. Since the hour and minute wheels are rotating at different speeds the pinion 114 will be held from rotation but will slide on the faster rotating steps 115 and 117. At the end of every twelve revolutions of the hour wheel the minute wheel will have advanced one complete turn relative thereto and during the next revolution teeth 116 and 118, formed in the steps, will move under the pinion to revolve it on shaft 113. This will, due to the meshing of pinion 114 and gear 112, force that gear along with the print wheel 105 and disc 108 ahead of disc 104 for one-twelfth of a revolution to bring the next hour printing character 106 into printing position.

In order to supply ink to the printing wheels a pair of felt ink pads 119, held in metal supports 120, are loosely mounted on the sleeve 97. The ink pads are held in place by a washer 121. As the print wheels rotate the ink pads are rotated with them to continuously keep the printing characters moist so that a good impression will be made on the chart.

In the operation of the printing mechanism the motor 73 rotates at a constant speed and drives the cams 85 and 88 past edge 90A. At the same time the motor 73 is rotating the print wheels 100 and 105. The gearing is so adjusted that every time the low portions of the cams come under edge 90A a pair of printing characters, one on each print wheel, are in printing position. Thereafter as edge 90A falls off the cams a recording of the time is made on the chart. At intervals of five minutes new printing characters will be brought into printing position and the cams will have rotated to again bring their low portions under edge 90A to repeat the operation. It will be obvious that the gearing and print wheel mechanism above described may be altered so that the time may be printed on the chart at other intervals of time rather than the five minute intervals above described.

Provisions are made for setting the print wheels so that they will print the proper time of day regardless of their position when the instrument was started. As has been described above the motor 73 drives gear 75 which is loose on shaft 78 and which drives the rest of the gear train through pawls 76 and ratchet 77. By turning shaft 78 by hand faster than the gear 75 is rotated, the print wheels can quickly be rotated to place the proper minute printing character in printing position. Thereafter if knob 111 and shaft 109 are moved to the left in Fig. 4 against the tension of spring 110, the pins 107 on disc 108 will be moved out of engagement with internal gear 112. Knob 111 can now be rotated and through disc 108 and pins 107 the print wheel 105 may be rotated relative to print wheel 100 to place the proper hour character 106 in printing position over the chart.

In order to facilitate the adjustment of the print wheels each of them is provided with numbers on its surface, between the characters 101 and 106, angularly displaced from the latter an amount so that when a character 101 or 106 is in printing position the corresponding number will be opposite a pointer 122 located at a readily visible position on plate 90. In setting the wheels the shaft 78 is first manually rotated until the proper number on wheel 100 is opposite pointer 122 thus indicating that the proper character 101 is in printing position. Thereafter knob 111 is pushed to the left and rotated until the proper number on wheel 105 is opposite pointer 122 to indicate that the proper character 106 is in printing position. If desired a mark 123 may be placed on the shoulder of gear 98 in such a position that just as the printing operation is to take place the mark 123 will be centered in an opening in the pointer. This may then serve as an indication that a printing operation is about to take place.

Switches may be located at the front of the instrument above the chart and pen mechanism to control the various motors that drive the elements of the instrument. Such switches have been shown in the upper part of Fig. 1.

From the above description it will be seen that I have provided a mechanism which, when used in a recording instrument, will produce an extremely legible and well correlated record.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. In a measuring instrument having a chart and drive means for said chart, the combination of time marking means for said chart, said marking means comprising, a rockable support, a pair of print wheels on said support and normally out of engagement with the chart, means to continuously rotate said print wheels at different rates of speed, whereby periodically different indicia will be brought into a position to print on said chart, means to continuously tend to move said support in a direction to bring said wheels into engagement with said chart, and means to keep said wheels out of engagement with said chart and operated in synchronism with said wheels to periodically release said support when the wheels are in said position to print on said chart.

2. In a measuring instrument having a chart, the combination of means to print the time of day on the chart comprising an hour print wheel and a minute print wheel, means to continuously drive said print wheels at different speeds and means to step said hour wheel ahead one-twelfth of a revolution each thirteen revolutions of said minute print wheel.

3. In a time printing mechanism, a support rotatable about a first axis, a print wheel mounted on said support to rotate about a second axis displaced from said first axis, an ink pad mounted for rotation about said first axis, the periphery of the ink pad being in frictional driving engagement with the periphery of the print wheel to be driven thereby as the print wheel rotates, and means to pivot said support around said first axis, the arrangement being that said ink pad is always in engagement with the print wheel.

4. In a measuring instrument having a chart, a time marking means for the chart comprising in combination a pivotally mounted support, printing means on said support adapted to be moved with said support into printing engagement with the chart, means to bias said support to printing position, a cam follower on said support, means to keep normally said support out of printing position comprising a pair of cams against which said cam follower bears, means to rotate said cams at different speeds, the faster rotating cam having a depression with an abrupt leading edge and a gradually rising trailing edge, the slower rotating cam having a depression with abrupt leading and trailing edges, said cams being so relatively positioned that the leading edges of said depressions come under said cam follower at the same time to allow said support to move to printing position, the faster rotating cam serving to move quickly said support out of printing position and the slower rotating cam serving to hold said support out of printing position between times that printing operations are to take place.

5. In a measuring instrument having a chart, the combination of a device to mark the time of day on the chart comprising a support, a pair of rotatably mounted time printing wheels on said support, a constantly rotating drive means for said wheels, a gear train between said drive means and said wheels, an overrunning clutch in said gear train, manually operated means to rotate that portion of the gear train between the overrunning clutch and said wheels whereby said wheels may be rotated faster by said manually operated means than they are by said constantly rotating means, and means to rotate one of said wheels relative to the other, whereby both of said wheels may be rotated by said manually operated means until said other wheel is properly positioned and said one wheel may be rotated relative to said other wheel until said one wheel is properly positioned so that the setting of said wheels may be quickly changed.

6. In a measuring instrument having a chart and a means to make continuously a record on said chart, the combination of means to print the time of day on the chart to show when the record thereon was made including a support, an hour print wheel and a minute print wheel rotatably mounted on said support, a train of gears by which said print wheels are rotated, said gear train including an overrunning clutch, constantly rotating drive means to drive said clutch and thereby rotate said gear train and print wheels at one speed, manually operated means to rotate said clutch and thereby rotate said gear train and print wheels at a faster speed, and other manually operable means to rotate said hour print wheel relative to said minute print wheel whereby said print wheels may readily be set to print the correct time of day.

JOHN A. CALDWELL.